US012602991B2

(12) United States Patent
Ji

(10) Patent No.: US 12,602,991 B2
(45) Date of Patent: Apr. 14, 2026

(54) METHOD FOR GENERATING TRAFFIC FLOW STATISTICAL DATA BY USING WIPER OPERATION INFORMATION OF VEHICLE, METHOD FOR CALCULATING ESTIMATED TIME OF ARRIVAL OF VEHICLE BY USING TRAFFIC FLOW STATISTICAL DATA GENERATED USING WIPER OPERATION INFORMATION OF VEHICLE, AND MANAGEMENT SERVER USED THEREFOR

(71) Applicant: 42DOT INC., Seoul (KR)

(72) Inventor: Seung Hyun Ji, Seoul (KR)

(73) Assignee: 42DOT INC., Seoul (KR)

( * ) Notice: Subject to any disclaimer, the term of this patent is extended or adjusted under 35 U.S.C. 154(b) by 272 days.

(21) Appl. No.: 18/245,219

(22) PCT Filed: Sep. 6, 2021

(86) PCT No.: PCT/KR2021/012022
§ 371 (c)(1),
(2) Date: Mar. 14, 2023

(87) PCT Pub. No.: WO2022/059983
PCT Pub. Date: Mar. 24, 2022

(65) Prior Publication Data
US 2023/0386324 A1 Nov. 30, 2023

(30) Foreign Application Priority Data
Sep. 16, 2020 (KR) ........................ 10-2020-0118766

(51) Int. Cl.
*G08G 1/01* (2006.01)
*G06Q 50/40* (2024.01)

(52) U.S. Cl.
CPC ......... *G08G 1/0112* (2013.01); *G08G 1/0125* (2013.01); *G06Q 50/40* (2024.01)

(58) Field of Classification Search
CPC .. G08G 1/0112; G08G 1/0125; G08G 1/0129; G08G 1/0133; G08G 1/0141; G06Q 50/40; G06Q 10/04
See application file for complete search history.

(56) References Cited

U.S. PATENT DOCUMENTS 7,512,489 B2 * 3/2009 Endo ...................... G01C 21/34 701/414
9,799,219 B2 * 10/2017 Fulger ..................... H04W 4/02
(Continued)

FOREIGN PATENT DOCUMENTS

JP 2002-358599 A 12/2002
JP 2014-048845 A 3/2014
(Continued)

OTHER PUBLICATIONS

International Search Report Dated Dec. 23, 2021.

*Primary Examiner* — Christopher George Fees
(74) *Attorney, Agent, or Firm* — Harvest IP Law, LLP

(57) ABSTRACT

The present disclosure provides a method of generating traffic flow statistical data by using wiper motion information of a vehicle, the method comprising: (a) receiving, by a management server, vehicle driving information including location information and wiper motion information of a vehicle driving on a road, from the vehicle; and (b) generating, by the management server, traffic flow statistical data of the road on which the vehicle is driving, based on the vehicle driving information.

2 Claims, 6 Drawing Sheets

(56) References Cited

U.S. PATENT DOCUMENTS

| | | | | |
|---|---|---|---|---|
| 11,988,526 | B2 * | 5/2024 | Baik | G05D 1/0274 |
| 12,136,338 | B2 * | 11/2024 | Nguyen | G08G 1/012 |
| 2016/0046237 | A1 * | 2/2016 | Sugimoto | G01C 21/3453<br>348/148 |
| 2017/0075036 | A1 * | 3/2017 | Pikhletsky | G01R 33/091 |
| 2022/0018674 | A1 * | 1/2022 | Xu | G06Q 10/08355 |
| 2023/0010647 | A1 * | 1/2023 | Kälvesten | B60W 40/06 |

FOREIGN PATENT DOCUMENTS

| | | | |
|---|---|---|---|
| KR | 10-1028293 | B1 | 4/2011 |
| KR | 10-2012-0003115 | A | 1/2012 |
| KR | 10-2014-0013747 | A | 2/2014 |
| KR | 10-1602746 | B1 | 3/2016 |
| KR | 10-2016-0073791 | A | 6/2016 |
| KR | 10-2019-0064109 | A | 6/2019 |
| KR | 10-1043981 | B1 | 12/2020 |
| KR | 10-2197195 | B1 | 10/2021 |

* cited by examiner

METHOD FOR GENERATING TRAFFIC FLOW STATISTICAL DATA BY USING WIPER OPERATION INFORMATION OF VEHICLE, METHOD FOR CALCULATING ESTIMATED TIME OF ARRIVAL OF VEHICLE BY USING TRAFFIC FLOW STATISTICAL DATA GENERATED USING WIPER OPERATION INFORMATION OF VEHICLE, AND MANAGEMENT SERVER USED THEREFOR

CROSS REFERENCE TO RELATED APPLICATION(S)

This application is a National Stage of International Application No. PCT/KR2021/012022 filed Sep. 6, 2021, claiming priority based on Korean Patent Application No. 10-2020-0118766 filed Sep. 16, 2020.

TECHNICAL FIELD

The present disclosure relates to a method of generating traffic flow statistical data by using wiper motion information of a vehicle, a method of calculating an estimated time of arrival of the vehicle by using the traffic flow statistical data generated using wiper motion information of the vehicle, and a management server used therein, more specifically, to a method of generating traffic flow statistical data by using wiper motion information of a vehicle, a method of calculating an estimated time of arrival of the vehicle by using the traffic flow statistical data generated using wiper motion information of the vehicle, and a management server used therein, whereby traffic flow statistical data including weather information in units of roads is secured by generating traffic flow statistical data by using vehicle driving information including wiper motion information of a vehicle driving on a road, and an estimated time of arrival calculated with very high accuracy, by considering the weather conditions of the road is provided to a driver as the time of arrival is calculated based on the traffic flow statistical data including the weather information of the road.

BACKGROUND ART

In general, a navigation system calculates and provides an Estimated Time of Arrival (ETA) from a point of departure to a destination together with a result of searching for a travel route to a user.

The above-described navigation system uses real-time traffic flow information collected for each road included in the travel route to increase the accuracy of ETA calculation, but does not utilize weather information, which is a factor that greatly affects traffic flow. Thus, ETA calculated by the navigation system according to the related art is limited in reliability.

Weather information provided by the Korea Meteorological Administration is generally not for roads, but is provided administrative unit-wise, and thus, it is difficult to utilize the weather information provided by the Korea Meteorological Administration in a navigation system.

DESCRIPTION OF EMBODIMENTS

Technical Problem

Accordingly, an object of the present disclosure is to provide a method of generating traffic flow statistical data by using wiper motion information of a vehicle, wherein the method allows to secure traffic flow statistical data including weather information in units of roads, by generating traffic flow statistical data by using vehicle driving operation including wiper motion information of a vehicle that is driving on a road.

In addition, an object of the present disclosure is to provide a method of calculating an estimated time of arrival of vehicle driving, wherein the method allows to provide a user with an estimated time of arrival calculated with very high accuracy, by considering the weather conditions of a road, as the time of arrival is calculated based on the traffic flow statistical data including weather information in units of roads.

Solution to Problem

A method of generating traffic flow statistical data by using wiper motion information of a vehicle, includes: (a) receiving, by a management server, vehicle driving information including location information and wiper motion information of a vehicle driving on a road, from the vehicle; and (b) generating, by the management server, traffic flow statistical data of the road on which the vehicle is driving, based on the vehicle driving information.

Preferably, the traffic flow statistical data may include driving speed information of the vehicle, driving time information of the vehicle, and motion speed level information of the wiper included in the wiper motion information.

The method may further include, further including, after (a), and before (b), determining, by the management server, whether or not the wiper operates, based on the wiper motion information.

In (b), when the management server determines that the wiper is operating, the management server may generate special traffic flow statistical data which is traffic flow statistical data in special weather conditions of rain or snow, and when the management server determines that the wiper is not operating, the management server may generate general traffic flow statistical data which is traffic flow statistical data in general weather conditions with no rain or snow.

A management server according to the present disclosure includes: a receiver configured to receive vehicle driving information including location information and wiper motion information of a vehicle driving on a road, from the vehicle; and a generator configured to generate traffic flow statistical data of the road on which the vehicle is driving, based on the vehicle driving information.

Preferably, the traffic flow statistical data may include driving speed information of the vehicle, driving time information of the vehicle, and motion speed level information of the wiper included in the wiper motion information.

Also, the management server may further include a determiner configured to determine whether the wiper operates, based on the wiper motion information.

When the determiner determines that the wiper is operating, the generator may generate special traffic flow statistical data which is traffic flow statistical data in special weather conditions of rain or snow, and when the determiner determines that the wiper is not operating, the generator may generate general traffic flow statistical data which is traffic flow statistical data in general weather conditions with no rain or snow.

A method of calculating an estimated time of arrival of a vehicle, by using traffic flow statistical data generated using wiper motion information of the vehicle, according to the present disclosure, includes: (a) providing, by a management server, a storage unit storing traffic flow statistical data generated based on vehicle driving information including location information and wiper motion information of a vehicle driving on a road; (b) receiving, by the management server, from the vehicle, a request for calculating an estimated time of arrival with respect to a travel route of the vehicle, which is determined according to point of departure information and destination information of the vehicle; (c) searching for, by the management server, vehicle driving information including wiper motion information received from a vehicle that has previously driven a road included in the travel route of the vehicle; and (d) calculating, by the management server, an estimated time of arrival with respect to the travel route based on the wiper motion information included in the found vehicle driving information and the traffic flow statistical data.

Preferably, the traffic flow statistical data may include driving speed information of the vehicle, driving time information of the vehicle, and motion speed level information of the wiper included in the wiper motion information.

A management server according to the present disclosure includes: a storage unit storing traffic flow statistical data generated based on vehicle driving information including location information and wiper motion information of a vehicle driving on a road; a receiver configured to receive, from the vehicle, a request for calculating an estimated time of arrival with respect to a travel route of the vehicle, which is determined according to point of departure information and destination information of the vehicle; and a determiner configured to search for vehicle driving information including wiper motion information received from a vehicle that has previously driven a road included in the travel route of the vehicle; and calculate an estimated time of arrival with respect to the travel route based on the wiper motion information included in the found vehicle driving information and the traffic flow statistical data.

Preferably, the traffic flow statistical data may include driving speed information of the vehicle, driving time information of the vehicle, and motion speed level information of the wiper included in the wiper motion information.

Advantageous Effects of Disclosure

According to the present disclosure, traffic flow statistical data including weather information in units of roads may be secured by generating traffic flow statistical data by using vehicle driving information including wiper motion information of a vehicle driving on a road.

In addition, according to the present disclosure, an estimated time of arrival may be calculated based on traffic flow statistical data including weather information in units of roads, and thus, an estimated time of arrival that is calculated with very high accuracy, by considering the weather conditions of a road, may be provided to a driver.

BEST MODE

Figure 1:
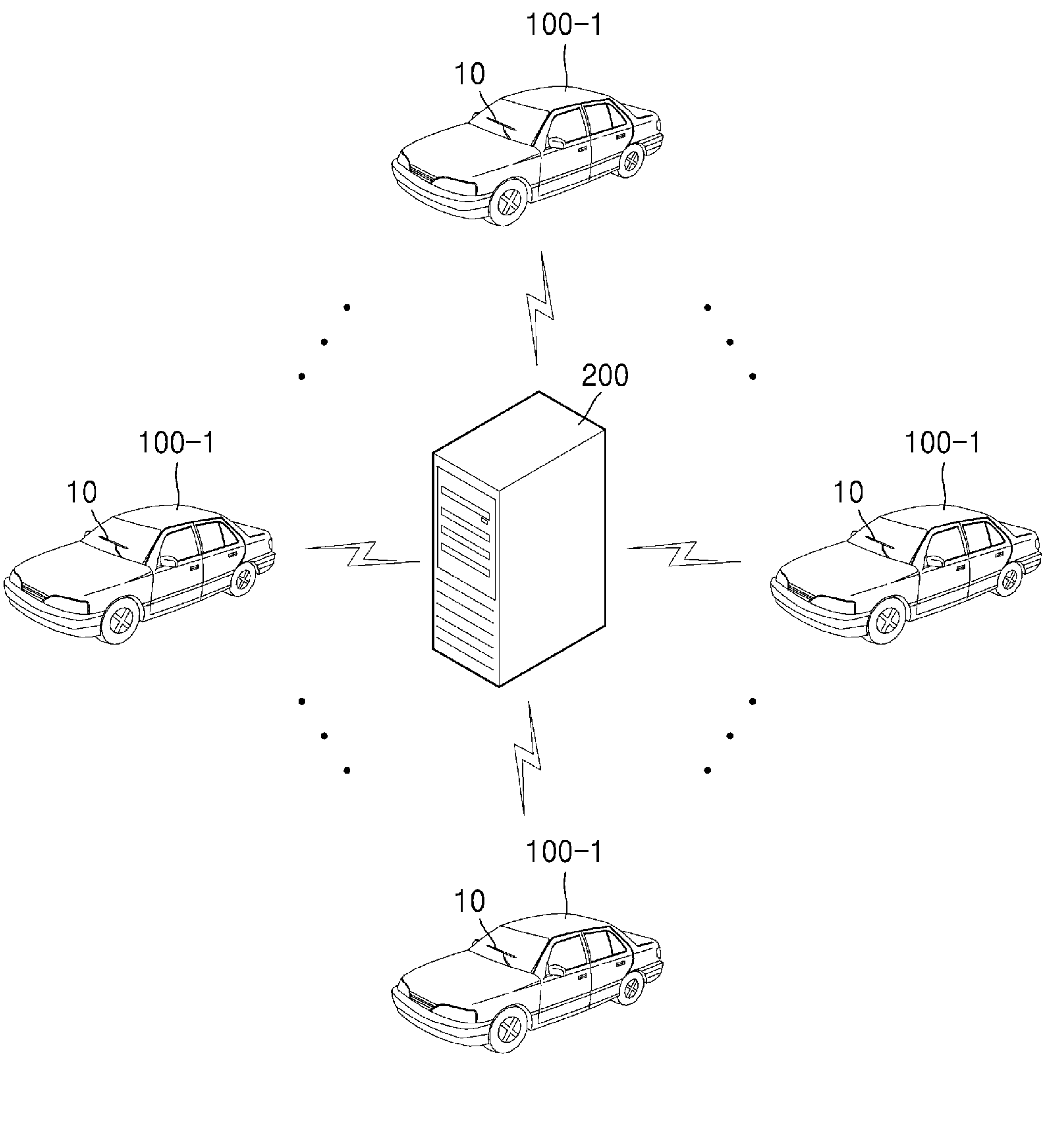
FIG. 1 is a structural diagram of a system for generating traffic flow statistical data by using wiper motion information of a vehicle, according to an embodiment of the present disclosure.

Disclosed are a method of generating traffic flow statistical data by using wiper motion information of a vehicle, a method of calculating an estimated time of arrival of vehicle driving, by using the traffic flow statistical data generated using wiper motion information of the vehicle, and a management server used therein. The present disclosure is implemented in that the management server receives, from a vehicle which is driving on a road, vehicle driving information including location information of the vehicle and wiper motion information of the vehicle, and generates, based on the vehicle driving information, traffic flow statistical data of the road on which the vehicle is driving. According to the present disclosure, traffic flow statistical data including weather information in units of roads may be secured by generating traffic flow statistical data by using vehicle driving information including wiper motion information of a vehicle driving on a road. In addition, according to the present disclosure, an estimated time of arrival may be calculated based on traffic flow statistical data including weather information in units of roads, and thus, an estimated time of arrival that is calculated with very high accuracy, by considering the weather conditions of a road may be provided to a driver.

MODE OF DISCLOSURE

Hereinafter, the present disclosure will be described in more detail with reference to the drawings. It should be noted that the same components in the drawings are denoted by the same reference numerals wherever possible. In addition, detailed descriptions of well-known functions and configurations that may unnecessarily obscure the gist of the present disclosure is omitted.

FIG. 1 is a structural diagram of a system for generating traffic flow statistical data by using wiper motion information of a vehicle, according to an embodiment of the present disclosure. Referring to FIG. 1, the system for generating traffic flow statistical data by using wiper motion information of a vehicle, according to an embodiment of the present disclosure, includes a plurality of first vehicles 100-1 and a management server 200.

Each of the plurality of first vehicles 100-1 drives on a road by individually operating a wiper 10 according to the weather conditions of the road on which they are driving, and transmits vehicle driving information including location information of the vehicle and motion information of the wiper 10 to the management server 200 in real time.

To this end, in implementing the present disclosure, a GPS module generating location information of a vehicle, a wiper motion detection module for generating motion information of the wiper 10 installed on the windshield of the vehicle, and a communication module for transmitting the location information of the vehicle and the motion information of the wiper 10 to the management server 200 may be installed in the first vehicle 100-1.

Further, in implementing the present disclosure, as a navigation program installed in a vehicle terminal such as a navigation device installed in the first vehicle 100-1 or a smart phone is executed, a camera module provided in the vehicle terminal may be activated to detect motion of the wiper 10, and the vehicle terminal may transmit the wiper motion information detected as above to the management server 200 together with location information of the vehicle terminal.

In addition, in implementing the present disclosure, the vehicle terminal may receive the wiper motion information from the first vehicle 100-1 through CAN (Controller Area Network) communication provided in the first vehicle 100-1 itself, and transmit the wiper motion information, together with the location information of the vehicle information, to the management server 200.

In addition, in implementing the present disclosure, as the wiper motion detection module for generating motion information of the wiper 10 is installed in the first vehicle 100-1, and a navigation program installed in the vehicle terminal is executed, the vehicle terminal may receive wiper motion information from the wiper motion detection module installed in the vehicle 100-1, through short-range communication such as Bluetooth®, and the vehicle terminal may transmit the received wiper motion information, together with the location information of the vehicle terminal, to the management server 200.

In implementing the present disclosure, the wiper motion information may include information indicating whether the wiper 10 is operating and motion speed level information of the wiper 10, which is typically increased according to the amount of rain or snow.

The management server 200 is a server installed and operated by a business operator who provides various vehicle operation-related services by using traffic flow statistical data generated using wiper motion information of the vehicle, and the management server 200 generates traffic flow statistical data of roads on which the plurality of first vehicles 100-1 are respectively driving, based on the vehicle driving information received from the plurality of first vehicles 100-1.

Figure 2:
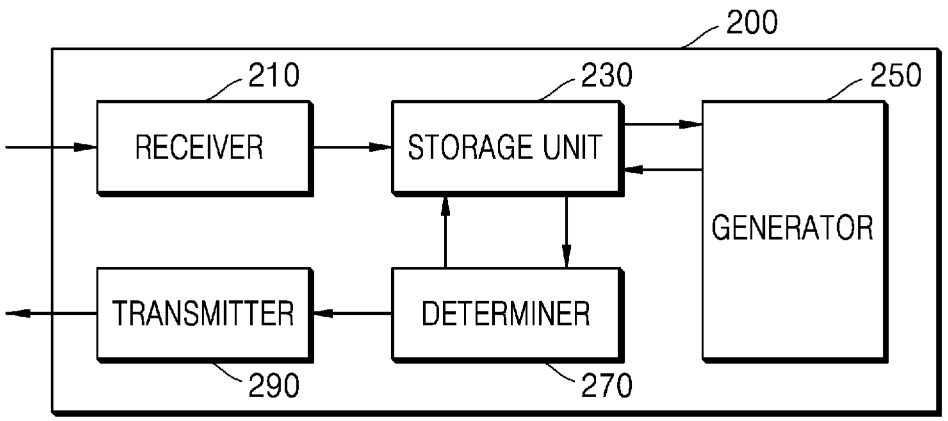
FIG. 2 is a functional block diagram illustrating a structure of a management server for executing a method of generating traffic flow statistical data by using wiper motion information of a vehicle, according to an embodiment of the present disclosure, and a method of calculating an estimated time of arrival of vehicle driving, by using the traffic flow statistical data generated using the wiper motion information of the vehicle, according to an embodiment of the present disclosure is used.

FIG. 2 is a functional block diagram illustrating a structure of the management server 200 for executing a method of generating traffic flow statistical data by using wiper motion information of a vehicle, according to an embodiment of the present disclosure, and a method of calculating an estimated time of arrival of vehicle driving, by using the traffic flow statistical data generated using the wiper motion information of the vehicle, according to an embodiment of the present disclosure is used.

Referring to FIG. 2, the management server 200 according to an embodiment of the present disclosure includes a receiver 210, a storage unit 230, a generator 250, a determiner 270, and a transmitter 290.

In implementing the method of generating traffic flow statistical data by using wiper motion information of a vehicle, according to an embodiment of the present disclosure, the receiver 210 of the management server 200 receives vehicle driving information including location information and wiper motion information of the first vehicle 100-1, and the determiner 270 of the management server 200 determines whether the wiper 10 installed in the first vehicle 100-1 operates, based on the wiper motion information received from the first vehicle 100-1.

The generator 250 of the management server 200 generates, based on vehicle driving information of the first vehicle 100-1, traffic flow statistical data of a road on which the first vehicle 100-1 is driving.

In detail, when the determiner 270 determines that the wiper (10) is operating, the generator 250 of the management server 200 generates special traffic flow statistical data which is traffic flow statistical data in special weather conditions such as rain or snow. When the determiner 270 determines that the wiper (10) is not operating, the generator 250 generates general traffic flow statistical data which is traffic flow statistical data in general weather situations with no rain or snow.

Traffic flow statistical data about each road generated by the generator 250 are cumulatively stored in the storage unit 230 of the management server 200, and various types of information received by the receiver 210 and various types of determination information of the determiner 270 are stored therein.

Figure 3:
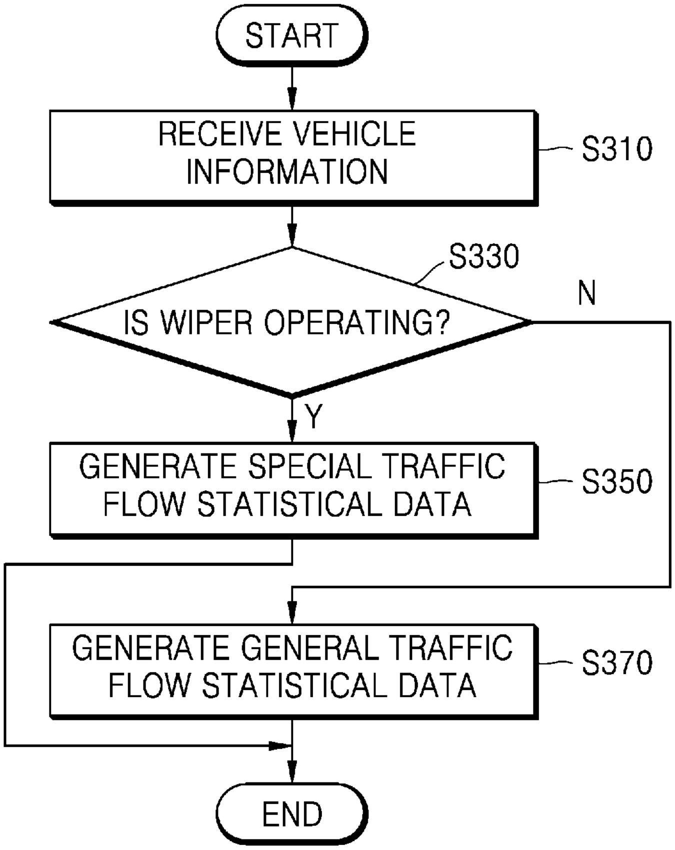
FIG. 3 is a flowchart of a process of performing a method of generating traffic flow statistical data by using wiper motion information of a vehicle, according to an embodiment of the present disclosure.

FIG. 3 is a flowchart of process of performing a method of generating traffic flow statistical data by using wiper motion information of a vehicle, according to an embodiment of the present disclosure. A process of performing a method of generating traffic flow statistical data by using wiper motion information of a vehicle, according to an embodiment of the present disclosure, is now described with reference to FIGS. 1 to 3.

First, the receiver 210 of the management server 200 receives, in real time from the plurality of first vehicles 100-1 driving on a road, vehicle driving information including location information of the first vehicles 100-1 and motion information of the wiper 10 installed in the first vehicle 100-1 (S310).

Then the determiner 270 of the management server 200 determines whether the wiper (10) installed in the first vehicle 100-1 is currently operating, based on the motion information of the wiper 10 received from the first vehicle 100-1 (S330).

When the determiner 270 of the management server 200 determines that the wiper (10) of the first vehicle 100-1 is currently operating, based on the wiper motion information, the generator 250 of the management server 200 generates special traffic flow statistical data which is traffic flow statistical data in special weather conditions such as rain or snow (S350).

12/11 In generating the special traffic flow statistical data, the generator 250 of the management server 200 may generate the special traffic flow statistical data such that the special traffic flow statistical data includes motion speed level information of the wiper 10 included in the wiper motion information (e.g., level 1 to level 5), road information about roads on which the first vehicle 100-1 specified from the location information of the first vehicle 100-1 is driving (e.g., road name or road number), driving time information about a time range, in which vehicle driving information is received from the first vehicle 100-1 (e.g., Monday 13:00-13:05), and driving speed information of the first vehicle 100-1 in a road section on which the first vehicle 100-1 is driving, wherein the driving speed information is calculated by the determiner 270 based on the location information of the first vehicle 100-1 and a time when the location information is received from the first vehicle 100-1.

When the determiner 270 of the management server 200 determines that the wiper (10) of the first vehicle 100-1 is not currently operating, based on the wiper motion information, the generator 250 of the management server 200 generates general traffic flow statistical data which is traffic flow statistical data in general weather conditions with no rain or snow (S370).

In generating the special traffic flow statistical data, the generator 250 of the management server 200 may generate the general traffic flow statistical data such that the general traffic flow statistical data includes road information about roads on which the first vehicle 100-1 specified from the location information of the first vehicle 100-1 is driving (e.g., road name or road number), driving time information about a time range, in which vehicle driving information is received from the first vehicle 100-1 (e.g., Monday 13:00-13:05), and driving speed information of the first vehicle 100-1 in a road section on which the first vehicle 100-1 is driving, wherein the driving speed information is calculated by the determiner 270 based on the location information of the first vehicle 100-1 and a time when the location information is received from the first vehicle 100-1.

Figure 4:
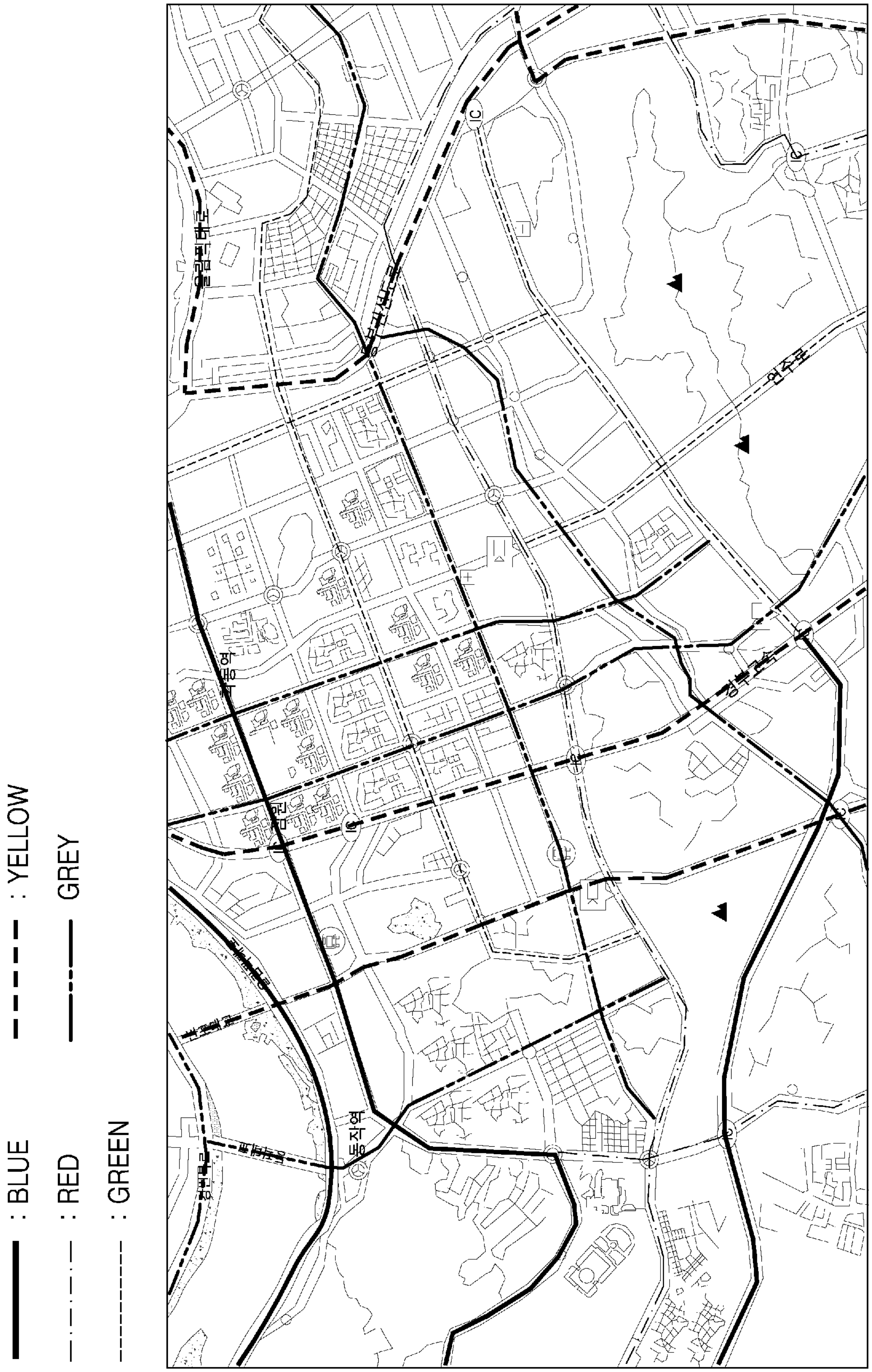
FIG. 4 is a view showing a special situation road traffic map generated according to the present disclosure.

In addition, in implementing the present disclosure, the generator 250 of the management server 200 generates a general condition road traffic map which is a road traffic map in which the general traffic flow statistical data generated with respect to each road is stored in association with each piece of road information, in the storage unit 230, and may generate, apart from this and as illustrated in FIG. 4, a special condition road traffic map which is a road traffic map in which the special traffic flow statistical data generated with respect to each road is stored in association with each piece of road information, in the storage unit 230.

In addition, as illustrated in FIG. 4, when generating the special condition road traffic map, the generator 250 of the management server 200 may differentially display colors of corresponding roads according to motion speed level information of the wiper 10 by varying the colors (e.g., level 1 to level 5).

Figure 5:
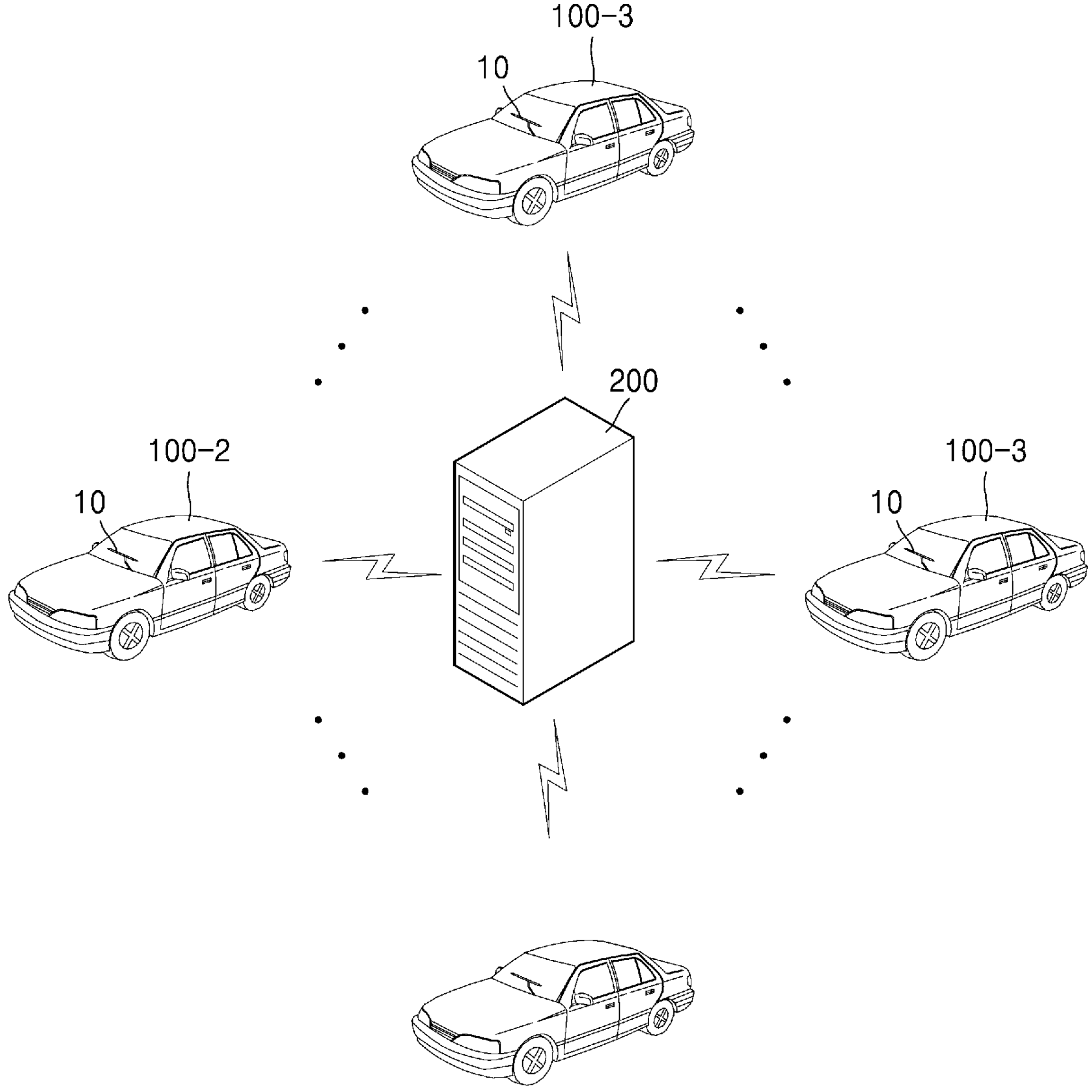
FIG. 5 is a structural diagram of a system for calculating an estimated time of arrival of vehicle driving, by using traffic flow statistical data generated using wiper motion information of a vehicle, according to an embodiment of the present disclosure.

FIG. 5 is a structural diagram of a system for calculating an estimated time of arrival of vehicle driving, by using traffic flow statistical data generated using wiper motion information of a vehicle, according to an embodiment of the present disclosure. Referring to FIG. 5, the system for calculating an estimated time of arrival of vehicle driving, by using traffic flow statistical data generated using wiper motion information of a vehicle, according to an embodiment of the present disclosure, includes a second vehicle 100-2, a third vehicle 100-3, and a management server 200.

The second vehicle 100-2 is a vehicle driven by a driver who wants to check an estimated time of arrival for a destination through the management server 200 before starting driving the vehicle, and the third vehicle 100-3 is a vehicle that has most recently driven, prior to the second vehicle 100-2, on a road included in a travel route from a point of departure to the destination of the second vehicle 100-2.

The management server 200 is installed and operated by a business operator who provides related services by using the method of calculating an estimated time of arrival of vehicle driving, by using the traffic flow statistical data generated using the wiper motion information of the vehicle, according to an embodiment of the present disclosure is used.

The management server 200 calculates an estimated time of arrival with respect to a corresponding travel route based on vehicle driving information including wiper motion information and vehicle location information, received from the third vehicle 100-3 that has previously driven on the road included in the travel route of the second vehicle 100-2 and travel route information of the second vehicle 100-2 determined according to point of departure information and destination information received from the second vehicle 100-2.

In implementing the present disclosure, the management server 200 in FIG. 1 and the management server 200 in FIG. 5 may be respectively installed and operated independently, but it may be preferable when a single server is installed and operated, in which a function of the management server 200 of FIG. 1 and a function of the management server 200 of FIG. 5 are integrated.

Thus, when the management server 200 of FIG. 2 performs the method of calculating an estimated time of arrival of vehicle driving, by using the traffic flow statistical data generated using the wiper motion information of the vehicle, according to an embodiment of the present disclosure, the receiver 210 of the management server 200 may receive a request for calculating an estimated time of arrival including the point of departure information and the destination information from the second vehicle 100-2.

The determiner 270 of the management server 200 searches for vehicle driving information including the wiper motion information received from the third vehicle 100-3 and stored, wherein the third vehicle 100-3 has previously driven on the road included in the travel route of the second vehicle 100-2, and calculates an estimated time of arrival with respect to the corresponding travel route based on wiper motion information and vehicle location information included in the found vehicle driving information and traffic flow statistical data previously generated and stored in the storage unit 230, and the transmitter 290 of the management server 200 transmits the calculated estimated time of arrival information to the second vehicle 100-2.

Figure 6:
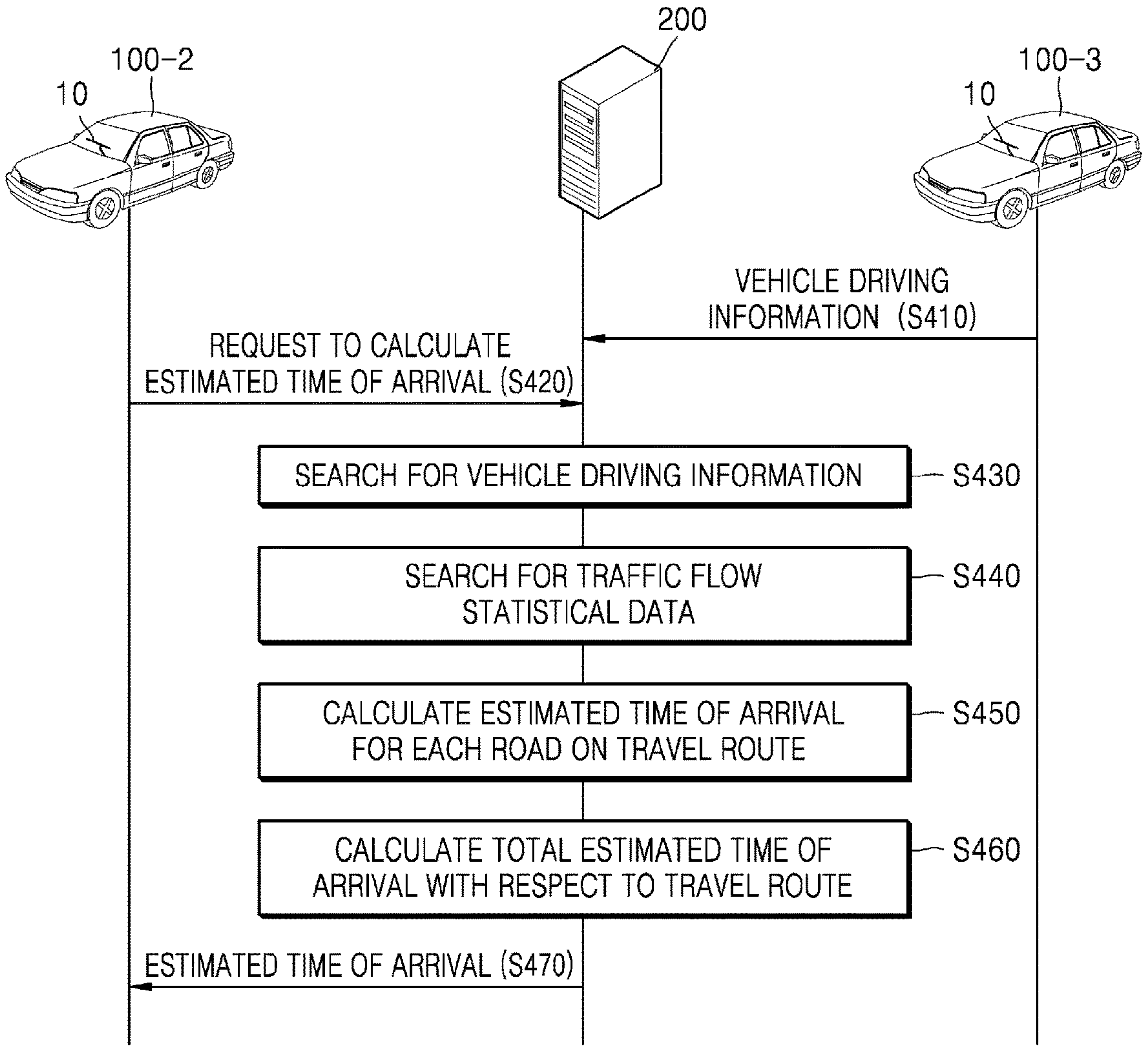
FIG. 6 is a signal flow diagram for describing a process of performing a method of calculating an estimated time of arrival of vehicle driving, by using traffic flow statistical data generated using wiper motion information of a vehicle, according to an embodiment of the present disclosure.

FIG. 6 is a signal flow diagram for describing a process of performing a method of calculating an estimated time of arrival of vehicle driving, by using traffic flow statistical data generated using wiper motion information of a vehicle, according to an embodiment of the present disclosure. Hereinafter, a process of performing a method of calculating an estimated time of arrival of vehicle driving, by using traffic flow statistical data generated using wiper motion information of a vehicle, according to an embodiment of the present disclosure is described with reference to FIGS. 2, 5 and 6.

First, while the general traffic flow statistical data and the special traffic flow statistical data generated by the generator 250 of the management server 200 according to the method described above with reference to FIG. 3 are stored in the storage unit 230 of the management server 200, the management server 200 receives and stores vehicle driving information including wiper motion information and vehicle location information from a plurality of third vehicles 100-3 respectively driving on a road (S410).

As the driver of the second vehicle 100-2 inputs point of departure information and destination information of the vehicle to a navigation device installed in the vehicle, the management server 200 receives, from the second vehicle 100-2, a request for calculating an estimated time of arrival, the request including the point of departure information and the destination information (S420).

Then the determiner 270 of the management server 200 generates travel route information of the second vehicle 100-2 on a road based on the point of departure information and the destination information received from the second vehicle 100-2, and searches the vehicle driving information received from the third vehicle 100-3 and stored in operation S410 described above, for vehicle driving information including vehicle location information corresponding to each road included in the travel route of the second vehicle 100-2 (S430).

Then, the determiner 270 of the management server 200 searches for traffic flow statistical data corresponding to each road based on the wiper motion information included in the found vehicle driving information as described above (S440).

In detail, for example, when assuming that there are five consecutive roads (Roads 1 to 5) constituting the travel route of the second vehicle 100-2, and when the determiner 270 of the management server 200 determines that the wiper of the third vehicle 100-3 is not operating, based on the wiper motion information included in vehicle driving information of the third vehicle 100-3 found with respect to Road 1, the determiner 290 of the management server 200 searches for general traffic flow statistical data that includes Road 1 as road information and a time range, in which the request for calculating an estimated time of arrival is received from the second vehicle 100-2 in operation S420 described above, as driving time information, and may calculate an estimated time of arrival T1, required by the second vehicle 100-2 to drive Road 1, based on driving speed of the first vehicle 100-1 included in the found general traffic flow statistical data (S450).

When the motion speed level information of the wiper 10 in the wiper motion information included in the vehicle driving information of the third vehicle 100-3, found with respect to Road 1 is level 1, the determiner 270 of the management server 200 searches for special traffic flow statistical data which includes Road 1 as road information and a time range, in which the request for calculating an estimated time of arrival is received from the second vehicle 100-2 in operation S420 described above, as driving time information.

When the motion speed level information of the wiper 10 included in the special traffic flow statistical data found with respect to Road 1 as described above is level 1 and matches the motion speed level information of the wiper 10 included in the vehicle driving information of the third vehicle 100-3 found with respect to Road 1, the determiner 270 of the management server 200 calculates the estimated time of arrival T1 required for the second vehicle 100-2 to drive on Road 1, based on the motion speed information of the first vehicle 100-1, included in the found special traffic flow statistical data.

When the motion speed level information of the wiper 10 in the wiper motion information included in the vehicle driving information of the third vehicle 100-3 found with respect to Road 1 is level 1, and the determiner 270 of the management server 200 has searched for special traffic flow statistical data that includes Road 1 as road information, but no special traffic flow statistical data including Road 1 as road information is found (that is, when special traffic flow statistical data about Road 1 is not generated and stored), the determiner 270 of the management server 200 may search for general traffic flow statistical data that includes Road 1 as road information and a time range, in which the request for calculating an estimated time of arrival is received from the second vehicle 100-2 in operation S420 described above, as driving time information, and may estimate a driving speed of the second vehicle 100-2 on Road 1 based on the driving speed information of the first vehicle 100-1, included in the found general traffic flow statistical data and property information of Road 1.

To this end, the determiner 270 of the management server 200 may calculate a ratio of a driving speed of the first vehicle 100-1, included in the general traffic flow statistical data on a road, for which both general traffic flow statistical data and special traffic flow statistical data are generated, and a ratio of the driving speed of the first vehicle 100-1, included in the special traffic flow statistical data, with respect to each motion speed level of wiper 10, included in the special traffic flow statistical data and thus calculate a speed reduction rate of the vehicle according to the properties of each road and a motion speed level of the wiper 10 and store the speed reduction rate of the vehicle in the storage unit 230 as shown in Table 1 below

TABLE 1

| Road Property | level 1 | level 2 | level 3 | level 4 | level 5 |
|---|---|---|---|---|---|
| Expressway | 5% | 7% | 9% | 10% | 11% |
| General National Road | 7% | 8% | 9% | 10% | 11% |
| Special Cities and Provinces | 9% | 11% | 13% | 15% | 17% |
| Metropolitan Cities and Provinces | 8% | 10% | 12% | 14% | 16% |
| Local Road | 4% | 6% | 8% | 10% | 12% |

Thus, when the motion speed level information of the wiper 10 in the wiper motion information included in the vehicle driving information of the third vehicle 100-3 found with respect to Road 1 is level 1, and the determiner 270 of the management server 200 has searched for special traffic flow statistical data that includes Road 1 as road information, but no special traffic flow statistical data including Road 1 as road information is found, the determiner 270 of the management server 200 may search for general traffic flow statistical data that that includes Road 1 as road information, and may estimate a driving speed of the second vehicle 100-2 by applying, to the driving speed of the first vehicle 100-1, included in the found general traffic flow statistical data, a speed reduction rate (5%) determined according Table 1 based on the property information of Road 1 (for example, Expressway) and the motion speed level information of the wiper (level 1), included in the vehicle driving information found in operation S430 described above. When special traffic flow statistical data including Road 1 as road information is found, but the motion speed level of the wiper 10, included in the found special traffic flow statistical data is level 2 and does not match level 1, which is the wiper motion speed level information of the third vehicle 100-3, the determiner 270 of the management server 200 may search for general traffic flow statistical data that that includes Road 1 as road information, and may estimate, as the driving speed of the second vehicle 100-2, an average of the driving speed of the first vehicle 100-1, included in the found general traffic flow statistical data and the driving speed of the first vehicle 100-1, included in the special traffic flow statistical data that includes level 2 as the motion speed level information of the wiper 10.

In addition, when the motion speed level information of the wiper 10 in the wiper motion information included in the found vehicle driving information of the third vehicle 100-3 is level 3, and the determiner 270 of the management server 200 has searched for special traffic flow statistical data corresponding to the corresponding road, but no special traffic flow statistical data including level 3 as the motion speed information of the wiper 10 is not found, and special traffic flow statistical data including level 2 as the motion speed information of the wiper 10 and special traffic flow statistical data including level 4 as the motion speed information of the wiper 10 are found, the determiner 270 of the management server 200 may estimate, as a driving speed of the first vehicle 100-1 with respect to level 3, an average of a driving speed of the first vehicle 100-1, included in the special traffic flow statistical data including level 2 as the motion speed information of the wiper 10 and a driving speed of the first vehicle 100-1, included in the special traffic flow statistical data including level 4 as the motion speed information of the wiper 10.

After calculating the estimated time of arrival T1 required for the second vehicle 100-2 to drive on Road 1 as described above, the determiner 270 of the management server 200 may calculate an estimated time of arrival T2 for driving Road 2 in the same manner.

When the determiner 270 of the management server 200 searches for special traffic flow statistical data or general traffic flow statistical data to calculate the estimated time of arrival T2 required to drive on Road 2, it may be preferable to search for special traffic flow statistical data or general traffic flow statistical data which includes Road 2 as road information, and as driving time information, a time range, in which the estimated time of arrival T1 required to drive on Road 1 has elapsed from a time when the request for calculating an estimated time of arrival is received from the second vehicle 100-2 is received in operation S420 described above.

Then, the determiner 270 of the management server 200 sequentially calculates an estimated time of arrival T3 required for the second vehicle 100-2 to drive on Road 3, an estimated time of arrival T4 required for the second vehicle 100-2 to drive on Road 4, and an estimated time of arrival T5 required for the second vehicle 100-2 to drive on Road 5 in the same, above-described manner, and calculate a total estimated time of arrival with respect to the travel route of the second vehicle 100-2 by summing up the above-described individually estimated times of arrival calculated with respect to each road (S460).

Then the transmitter 290 of the management server 200 transmits, to the second vehicle 100-2, the total estimated time of arrival information with respect to the travel route of the second vehicle 100-2 calculated as described above, together with the travel route information of the second vehicle 100-2 (S470).

Terms used in the present disclosure are only used to describe certain embodiments and are not intended to limit the present disclosure. In the embodiments below, the singular forms include the plural forms unless the context clearly indicates otherwise. In the present application, terms such as "comprise" or "have" are intended to designate that a feature, number, step, operation, component, part, or combination thereof described in the specification exists, but one or more other features It is to be understood that this does not preclude the possibility of the presence or addition of numbers, steps, operations, components, parts, or combinations thereof.

In the above, preferred embodiments and applications of the present disclosure have been illustrated and described, but the present disclosure is not limited to certain embodiments and applications described above, and various modifications may be made by those skilled in the art to which the present disclosure belongs, without departing from the gist of the present disclosure claimed in the claims, and the modifications should not be understood separately from the technical idea or prospect of the present disclosure.

The invention claimed is:

1. A management system comprising:

a plurality of vehicles equipped with a wiper motion detection module for generating motion information of the wiper installed on the windshield of the vehicle; and a server configured to:

store traffic flow statistical data generated based on vehicle driving information including location information and wiper motion information of the plurality of vehicles driving on a road;

receive a vehicle driving information from a plurality of third vehicles respectively driving on a road, wherein the third vehicle is a vehicle that has most recently driven, prior to a second vehicle, on a road included in a travel route from a point of departure to a point of destination of the second vehicle, wherein the vehicle driving information includes vehicle location information and wiper motion information, the receiving of the vehicle driving information comprises: collecting wiper motion information obtained by detecting motions of wipers installed on the plurality of third vehicle;

store the vehicle driving information including the wiper motion information and the vehicle location information received from a plurality of third vehicles;

receive, from the second vehicle, a request for calculating an estimated time of arrival with respect to a travel route of the second vehicle, which is determined according to the point of departure information and the point of destination information of the second vehicle; and search for vehicle driving information received from the third vehicle that has previously driven a road included in the travel route of the second vehicle;

calculate an estimated time of arrival with respect to the travel route based on the wiper motion information included in the found vehicle driving information and the traffic flow statistical data;

generating a road traffic map using each piece of road information based on the vehicle location information, wiper motion information and the traffic flow statistical data, and wherein the management server is further configured to:

select either special traffic flow statistical data or general traffic flow statistical data, based on the wiper motion information, when the special traffic flow statistical data is selected but does not exist in the storage unit, the management server selects the speed reduction rate based on the property of the road and motion speed level information of the wiper, and the management server searches for the general traffic flow statistical data of the road and estimates the driving speed by applying the selected speed reduction rate to the driving speed of the vehicle, included in the general traffic flow statistical data, wherein the speed reduction rate is a ratio of a driving speed included in the general traffic flow statistical data and a driving speed included in the special traffic flow statistical data, which is calculated for the each property of the road and each motion speed level information of the wiper included in the wiper motion information.

2. The management server of claim 1, wherein the traffic flow statistical data comprises driving speed information of the vehicle, driving time information of the vehicle, and motion speed level information of the wiper included in the wiper motion information.

* * * * *